(12) United States Patent
Kitawaki

(10) Patent No.: US 8,143,342 B2
(45) Date of Patent: Mar. 27, 2012

(54) COATING AGENT

(75) Inventor: Kazunori Kitawaki, Ibaraki (JP)

(73) Assignee: SK Kaken Co., Ltd., Osaka (JP)

( * ) Notice: Subject to any disclaimer, the term of this patent is extended or adjusted under 35 U.S.C. 154(b) by 6 days.

(21) Appl. No.: 12/158,475

(22) PCT Filed: Dec. 27, 2006

(86) PCT No.: PCT/JP2006/326082
§ 371 (c)(1),
(2), (4) Date: Jun. 20, 2008

(87) PCT Pub. No.: WO2007/077879
PCT Pub. Date: Jul. 12, 2007

(65) Prior Publication Data
US 2009/0264579 A1    Oct. 22, 2009

(30) Foreign Application Priority Data

Dec. 27, 2005 (JP) ................. 2005-376037
Aug. 29, 2006 (JP) ................. 2006-232845
Dec. 7, 2006 (JP) ................. 2006-331220

(51) Int. Cl.
*C09D 133/10* (2006.01)
*C09D 5/00* (2006.01)
*C09D 5/02* (2006.01)
*C09B 67/00* (2006.01)

(52) U.S. Cl. ........ 524/502; 524/501; 524/445; 524/447; 524/451; 525/50; 525/254

(58) Field of Classification Search ........... 524/501, 524/502, 445, 447, 449, 451; 525/50, 254
See application file for complete search history.

(56) References Cited

U.S. PATENT DOCUMENTS

| | | | |
|---|---|---|---|
| 4,792,357 A * | 12/1988 | Bier | 106/600 |
| 4,966,790 A * | 10/1990 | Iizuka et al. | 427/386 |
| 5,171,638 A | 12/1992 | Ozaki et al. | |
| 5,186,746 A * | 2/1993 | Freeman | 106/416 |
| 5,652,079 A * | 7/1997 | Mochizuki et al. | 430/111.1 |
| 2003/0073779 A1 * | 4/2003 | Tamori et al. | 524/588 |
| 2003/0186154 A1 * | 10/2003 | Suzuki et al. | 430/111.1 |

FOREIGN PATENT DOCUMENTS

| | | |
|---|---|---|
| EP | 0 469 613 B1 | 1/1995 |
| JP | 4-77564 | 3/1992 |
| JP | 4-89813 | 3/1992 |
| JP | 8-34955 | 2/1996 |
| JP | 9-12655 | 1/1997 |
| JP | 2003-276121 A | 9/2003 |
| JP | 2003-301139 A | 10/2003 |
| JP | 2005-320496 A | 11/2005 |

OTHER PUBLICATIONS

Korean Office Action issued by Korean Patent Office on Jun. 3, 2010 for the counterpart Korean Patent Application No. 10-2008-7014101.
Office Action dated Nov. 11, 2011 in Corresponding Japanese Application No. 2007-268145.

\* cited by examiner

*Primary Examiner* — James J Seidleck
*Assistant Examiner* — Deve E Valdez
(74) *Attorney, Agent, or Firm* — Knobbe Martens Olson & Bear LLP

(57) ABSTRACT

Disclosed is a coating agent including a synthetic resin emulsion (A) wherein an acrylic resin of which the main monomer component is an alkyl ester of (meth)acrylic acid, and a silicone resin of which the main monomer component is a cyclic siloxane compound are mixed in emulsion particles to set the ratio by weight of the former to the latter into the range of 99/1 to 30/70, and a particulate matter (B) having an average particle diameter of 0.5 to 500 μm and an oil absorption of 60 mL/100 g or less, wherein the particulate matter (B) has a pigment volume concentration of 10 to 90%. When this coating agent is stored or after a paint film is made therefrom, a fall in the water repellent effect thereof is restrained, so that an excellent water repellent performance can stably be exhibited.

13 Claims, No Drawings

COATING AGENT

This application is the US. National Phase under 35 U.S.C. §371 of international Application PCT/JP2006/326082, filed Dec. 27, 2006, which claims priority to Japanese Patent Application No. 2005-376037, filed Dec. 27, 2005. The international Application was published under PCT Article in a language other than English.

TECHNICAL FIELD

The present invention relates to a new coating agent. The coating agent may be a water-based painting composition, a water-based ink composition, or the like.

BACKGROUND ART

Hitherto, a water-repellent paint has been known as a material for giving waterproof performance, antifouling performance and so forth onto the surface of a building, or a civil engineering structure or the like. An example of the water-repellent paint is a paint containing a fluorine-contained resin. The surface of a paint film made therefrom has a high contact angle with water, and a small contact area with water, thereby repelling water to give waterproof performance, antifouling performance and so forth.

In recent years, desires of conversion from solvent-based paints to water-based paints have been increasing in the field of paints. Thus, this matter is not exceptional about water-repellent paints, either, and many investigations have been made for turning the paints into water-based paints.

For example, JP-A-2003-301139 describes a water-based paint wherein a specific water-based water repellent is incorporated into a solution of resin in water. However, in water-based paints as described in this publication, water droplets may remain in the surface of the paint film although water can be repelled to some degree. When the water droplets vaporize as they are, it is feared that stains or the like may be generated. About the water-based paint in the publication, its water repellent effect may be inactivated when the paint is stored. Thus, when the paint is used, a desired water repellent performance may not be exhibited. Furthermore, when the paint film is formed, the water repellent effect may be damaged with the passage of time.

DISCLOSURE OF THE INVENTION

Problems to be Solved by the Invention

In light of the above-mentioned problem, the present invention has been made. Thus, an object of the invention is to provide a coating agent making it possible to restrain its water repellent effect from falling when the coating agent, which may be a paint or the like, is stored or after a paint film is made therefrom, so as to exhibit an excellent water repellent performance stably.

Means to Solve the Problems

In order to attain the object, the inventors have made eager investigations so as to find out a coating agent which contains, as essential components, a synthetic resin emulsion wherein a specific acrylic resin and a specific silicone resin are mixed with each other in emulsion particles, and a particulate matter having a specific average particle diameter and a specific oil absorption, wherein the pigment volume concentration of the particulate matter is set into a specific range. Thus, the invention has been made.

Accordingly, the present invention is as follows:
1. A coating agent, comprising a synthetic resin emulsion (A) wherein an acrylic resin of which the main monomer component is an alkyl ester of (meth) acrylic acid, and a silicone resin of which the main monomer component is a cyclic siloxane compound are mixed in emulsion particles to set the ratio by weight of the former to the latter into the range of 99/1 to 30/70, and
a particulate matter (B) having an average particle diameter of 0.5 to 500 μm and an oil absorption of 60 mL/100 g or less,
wherein the particulate matter (B) has a pigment volume concentration of 10 to 90%.
2. The coating agent according to item 1, wherein the silicone resin is present at least in a surface layer of the emulsion particles.
3. The coating agent according to item 1 or 2, which comprises an outer layer wherein the acrylic resin and the silicone resin are mixed with each other, and an inner layer comprising the acrylic resin.
4. A coating agent, comprising a synthetic resin emulsion wherein an acrylic resin of which the main monomer component is an alkyl ester of (meth)acrylic acid, and a silicone resin of which the main monomer component is a cyclic siloxane compound are mixed in emulsion particles to set the ratio by weight of the former to the latter into the range of 99/1 to 30/70,
the coating agent comprising: a multilayer-structural synthetic resin emulsion (A-1) having an outer layer wherein the acrylic resin of which the main monomer component is the alkyl ester of (meth)acrylic acid, and the silicone resin of which the main monomer component is the cyclic siloxane compound, are mixed, and an inner layer containing the acrylic resin of which the main monomer component is the alkyl ester of (meth)acrylic acid, wherein the glass transition temperature of the acrylic resin in the inner layer is made lower than that of the acrylic resin in the outer layer; and
a particulate matter (B) having an average particle diameter of 0.5 to 500 μm and an oil absorption of 60 mL/100 g or less, as essential components,
the particulate matter (B) having a pigment volume concentration of 10 to 90%.
5. The coating agent according to any one of items 1-4, wherein the particulate matter (B) comprises flake particles.
6. The coating agent according to any one of items 1-5, the whole of which has a pigment volume concentration of 40 to 90%.

Effect of the Invention

The coating agent of the invention exhibits an excellent water repellent performance even when the agent is stored for a long term. Furthermore, the agent continues to keep an initial water repellent effect in a paint film made therefrom. Accordingly, according to the coating agent of the invention, an excellent water repellent performance can stably be obtained, and further advantageous effects can be obtained for waterproof performance, and antifouling performance and so forth.

BEST MODE FOR CARRYING OUT THE INVENTION

The best mode for carrying out the invention will be described hereinafter.

The synthetic resin emulsion (A) in the coating agent of the invention (referred to as the "component (A)" hereinafter) is an emulsion wherein an acrylic resin originating from an alkyl ester of (meth)acrylic acid, and a silicone resin originating from a cyclic siloxane compound are mixed in emulsion particles. The form of the acrylic resin and the silicone resin in the component (A) is not particularly limited, and may be a form that they are homogeneously mixed with each other. Preferably, the form is a form that they have a sea-island structure or the like, whereby they are separated from each other.

The acrylic resin originating from an alkyl ester of (meth)acrylic acid in the invention is an acrylic resin wherein the alkyl ester of (meth)acrylic acid is a main monomer component (the amount of the monomer component is 30% or more by weight, preferably 40% or more by weight, more preferably 50% or more by weight, even more preferably 70% or more by weight of all monomers which constitute the acrylic resin).

The silicone resin originating from a cyclic siloxane compound in the invention is a silicone resin wherein the cyclic siloxane compound is a main monomer component (the amount of the monomer component is 50% or more by weight, preferably 60% or more by weight, more preferably 70% or more by weight of all monomers which constitute the silicone resin).

The ratio by weight of the acrylic resin to the silicone resin in the component (A) is usually from 99/1 to 30/70, preferably from 97/3 to 40/60, more preferably from 95/5 to 50/50. When the two components are mixed at such a ratio, a coating agent can be obtained which has water repellent performance, film-formability, cracking resistance, and other various physical properties together.

The component (A) is a component for giving an excellent water repellent performance to a paint film made from the coating agent of the invention. Additionally, the use of the component (A) as a binder in the invention makes it possible to restrain the water repellent effect from being inactivated when the coating agent is stored and further keep an initial water repellent effect over a long period of time after a paint film is made from the agent.

In general, a coating agent, which may be a water-based paint or the like, considerably contains an amphipathic agent such as a surfactant. Thus, when a water repellent such as a silicone resin is incorporated into the coating agent, the amphipathic agent tends to hinder the water repellent effect which the water repellent originally has. In a coating agent wherein a water repellent is incorporated besides a binder, the water repellent departs from a paint film made from the agent with the passage of time, so that the water repellent effect may be damaged.

On the other hand, the component (A) is used as a binder in the invention, as described above, thereby making it possible to restrain a fall in the water repellent performance sufficiently when the coating agent, which may be a water-based paint or the like, is stored or after a paint film is made from the agent.

The acrylic resin which constitutes the component (A) is a polymer of which the main component is an alkyl ester of (meth)acrylic acid. The polymer is obtained by copolymerizing the main component with a different monomer if necessary. Examples of the alkyl ester of (meth)acrylic acid include methyl (meth)acrylate, ethyl (meth)acrylate, isopropyl (meth)acrylate, n-butyl (meth)acrylate, isobutyl (meth)acrylate, t-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, cyclohexyl (meth)acrylate, phenyl (meth)acrylate, and benzyl (meth)acrylate. The use amount of such an alkyl ester of (meth)acrylic acid is usually 30% or more by weight, preferably from 40 to 99.9% by weight, more preferably from 50 to 99.5% by weight, even more preferably from 70 to 99.5% by weight of all monomers constituting the component (A).

Examples of the different monomer include carboxyl-group-containing monomers, amino-group-containing monomers, pyridine based monomers, hydroxyl-group-containing monomers, nitrile-group-containing monomers, amide-group-containing monomers, epoxy-group-containing monomers, carbonyl-group-containing monomers, alkoxysilyl-group-containing monomers, and aromatic monomers. The use amount of such a monomer is usually from 0.1 to 60% by weight, preferably from 0.5 to 50% by weight, more preferably from 0.5 to 30% by weight of all the monomers constituting the component (A).

When a carboxyl-group-containing monomer, out of the above-mentioned examples, is copolymerized with the alkyl ester to prepare a carboxyl-group-containing acrylic resin, the stability of the component (A) can be made high. When a compound reactive with a carboxyl group is separately added to the copolymer, various physical properties of a paint film to be produced can be improved. Examples of the carboxyl-group-containing monomer include acrylic acid, methacrylic acid, crotonic acid, maleic acid and monoalkyl ester thereof, itaconic acid and monoalkyl esters thereof, and fumaric acid and monoalkyl esters thereof. Of these examples, particularly preferred are one or more selected from acrylic acid and methacrylic acid. The use amount of the carboxyl-group-containing monomer is usually from 0.1 to 40% by weight, preferably from 0.5 to 20% by weight of all the monomers constituting the component (A).

The silicone resin in the component (A) is a resin obtained by polymerizing a cyclic siloxane compound. Examples of the cyclic siloxane compound include hexamethylcyclotrisiloxane, octamethylcyclotetrasiloxane, and decamethylcyclopentasiloxane. When such a cyclic siloxane compound is polymerized, it is allowable to use a linear siloxane compound, a branched siloxane compound, an alkoxysilane compound or the like or use a catalyst for polymerization appropriately. Out of these examples, the alkoxysilane compound may be a silane compound having in the molecule thereof one or more alkoxyl groups. For example, the following silane coupling agent can be used: tetramethoxysilane, methyltrimethoxysilane, dimethyldimethoxysilane, vinylmethyldimethoxysilane, γ-(meth)acryloyloxypropyltrimethoxysilane, or 3-mercaptopropyltrimethoxysilane. When the cyclic siloxane compound is polymerized, the silicone resin and the acrylic resin can be chemically bonded to each other by using such an alkoxysilane compound together. Thus, an advantage is given from the viewpoint of paint film properties such as water resistance. The average molecular weight of the silicone resin is usually 10000 or more, preferably 50000 or more.

The component (A) in the invention is preferably a synthetic resin emulsion wherein the above-mentioned acrylic resin and silicone resin are mixed with each other and the silicone resin is present at least in a surface layer of the emulsion particles. The component (A) is in particular preferably a multilayer-structural synthetic resin emulsion (A-1) wherein the above-mentioned acrylic resin and silicone resin are mixed with each other, the resin emulsion comprising an outer layer wherein the acrylic resin and the silicone resin are mixed with each other, and an inner layer comprising the acrylic resin, and further the glass transition temperature of the acrylic resin in the inner layer being made lower than that of the acrylic resin in the outer layer (referred to as the "component (A-1)" hereinafter). When this component (A-1) is used, more remarkably advantageous effects can be obtained about water repellent performance. Furthermore, paint film performances such as cracking resistance can be made high. The ratio by weight of the outer layer to the inner layer is usually from 80/20 to 20/80, preferably from 70/30 to 30/70.

The component (A-1) can be obtained by, for example, a method of synthesizing the acrylic resin constituting the inner layer by emulsion polymerization, and then synthesizing the acrylic resin and silicone resin constituting the outer layer by emulsion polymerization. The component (A-1) may contain, as the resin constituting the inner layer, a silicone resin as described above. When the inner layer contains the silicone resin, the cracking resistance and others can be made high.

The glass transition temperature (referred to as the "Tg" hereinafter) of the acrylic resin constituting the inner layer is usually set into the range of −60 to 20° C. (preferably −50 to 10° C.). The Tg of the outer layer is usually from 20 to 100° C. (preferably 30 to 90° C.). When the Tg of each of the layers is in such a range, the above-mentioned advantageous effects can stably be obtained. The Tg in the invention is a value obtained by use of Fox's calculating formula.

When the component (A) contains a carboxyl-group-containing acrylic resin in the invention, effects such as blistering resistance, peeling resistance and washability can be made high by blending a compound reactive with a carboxyl group separately therewith. The adhesiveness of the surface of the paint film is decreased, and the water resistance and the antifouling performance are increased. This compound may be a compound having one or more functional groups selected from a carbodiimide group, an epoxy group, an aziridine group, an oxazoline group, and other groups. In the invention, a reactive compound having an epoxy group is particularly preferred.

Examples of the reactive compound having an epoxy group include ethylene glycol diglycidyl ether, polyethylene glycol diglycidyl ether, propylene glycol diglycidyl ether, polypropylene glycol diglycidyl ether, glycerol polyglycidyl ether, diglycerol polyglycidyl ether, polyglycerol polyglycidyl ether, diglycerol polyglycidyl ether, polyhydroxyalkane polyglycidyl ether, and sorbitol polyglycidyl ether. Besides, a water-soluble resin or emulsion comprising a polymer (i.e., a homopolymer or copolymer) made from an epoxy-group-containing monomer may also be used. The blend amount of such a compound is usually from 0.1 to 50 parts by weight, preferably from 0.3 to 20 parts by weight for 100 parts by weight of resin solids in the component (A).

In the invention, the component. (A) is used as a binder. A binder other than the component (A) may be used together with the component (A). Examples of this binder include synthetic resin emulsions other than the component (A), and various water-soluble resins. These may have crosslinking reactivity. Examples of the resins which can be used include cellulose, polyvinyl alcohol, vinyl acetate resin, alkyd resin, vinyl chloride resin, epoxy resin, silicone resin, acrylic resin, urethane resin, acrylsilicone resin and fluorine-contained resin; and composite resins made of two or more thereof. When the component (A) and the binder other than the component (A) are used together in the invention, an improvement in water repellent performance over time, and other advantageous effects can be attained. The blend ratio of the component (A) to the binder other than the component (A) is usually from about 95/5 to 20/80, preferably from about 90/10 to 30/70 in terms of solid weight.

In the case of using, as the binder other than the component (A), a crosslinking-reactive synthetic resin emulsion, physical properties such as water resistance and antifouling performance can be improved. The crosslinking reaction in this crosslinking-reactive synthetic resin emulsion is a reaction based on, for example, a combination of a hydroxyl group and an isocyanate group, a carbonyl group and a hydrazide group, a carboxyl group and a metallic ion, an epoxy group and an amino group, an epoxy group and a carboxyl group, an epoxy group and a hydrazide group, a carboxyl group and a carbodiimide group, a carboxyl group and oxazoline, or alkoxysilyl groups. The crosslinking-reactive emulsion may be an emulsion made of emulsion particles in which a crosslinking reaction as exemplified here is caused, or an emulsion made of emulsion particles crosslinking-reactive with a crosslinking agent. When the crosslinking-reactive synthetic resin emulsion is used, the blend ratio of the component (A) to this emulsion is desirably from about 95/5 to 20/80, more desirably from about 90/10 to 30/70 in terms of solid weight. In the invention, the above-mentioned carboxyl-group-reactive compound and the crosslinking-reactive synthetic resin emulsion can be used together.

The coating agent of the invention contains not only the component (A) as an essential component but also a particulate matter (B) having an average particle diameter of 0.5 to 500 μm and an oil absorption of 60 mL/100 g or less (referred to as the component (B) hereinafter) as an essential component. This component (B) is blended with the other components) to have a pigment volume concentration of 10 to 90%. By the blend of the component (B) in the invention, a structure of fine irregularities is given to the surface of the formed paint film. Thus, when water droplets contact the paint film, the contact area therewith can be made small. Thus, an excellent water repellent effect can be obtained.

The average particle diameter of the component (B) preferably ranges from 1 to 200 μm (more preferably from 2 to 100 μm, more preferably from 3 to 80 μm). If the average particle diameter of the component (B) is out of this range, a sufficient water repellent performance is not easily obtained. Specifically, if the average particle diameter of the component (B) is too large, the paint film surface becomes too coarse so that water may invade the film. If the average particle diameter is too small, it is difficult to form fine irregularities contributing to an improvement in the water repellent performance. The average particle diameter of the component (B) is obtained by observation with a transmission electron microscope, and is a value obtained by measuring the equivalent circle diameters of the individual particles as the diameters thereof, and then obtaining the distribution of the diameters (on the basis of the number of the particles).

The oil absorption of the component (B) is 60 mL/100 g or less, preferably 40 mL/100 g or less, more preferably 20 mL/100 g or less. If the component (B) is out of the range, a large amount of a dispersing agent becomes necessary to disperse the component (B). Thus, the water repellent effect is hindered. The oil absorption is a value obtained by a method prescribed in JIS K 5101-13-2:2004, and is a value represented by the volume (unit: mL) of boiled linseed oil absorbed in 100 g of a particulate matter.

About the component (B) in the invention, the material thereof is not particularly limited as long as the above-mentioned physical properties are satisfied. Thus, various particulate matters can be used. Examples of the material include heavy calcium carbonate, kaolin, clay, potter's clay, china clay, talc, barite powder, barium sulfate, barium carbonate, magnesium carbonate, silica powder, and aluminum hydroxide. Other examples thereof include marble, granite called Mikage Ishi, serpentine, granite, fluorite, white marble, feldspar, limestone, silica rock, silica sand, rubble or crushed stone, mica and siliceous shale, and crushed matters thereof; and pottery or porcelain crushed matters, ceramic crushed matters, glass crushed matters, resin crushed matters, rubber grains, plastic pieces and metal grains, and matters each obtained by coating the surface of any one of these matters for coloring.

In the invention, two or more particulate matters having different average particle diameter are used together as the component (B). The particulate matter (B) is preferably not spherical. The particulate matter preferably contains granular particles, rectangular particles, needle particles, irregularly-shaped particles, flake particles or other non-spherical particles. Specific examples of the flake particles out of these examples include talc, mica, and clay. The content of the flake particles in the particulate matter (B) may be 10% by volume, and is preferably 20% by volume, more preferably 30% by volume.

The component (B) is incorporated into the coating agent of the invention to have a pigment volume concentration of 10 to 90%, preferably 20 to 80%, more preferably 25 to 70%. In the case of attaching importance, in particular, to an improvement in the water slipping-down property (contact angle), the pigment volume concentration is preferably 55% or more. In the case of attaching importance to an improvement in the sealability (water anti-permeability) or the antifouling performance, the pigment volume concentration is preferably less than 55% by volume. If the pigment volume concentration of the component (B) is too small, a sufficient water repellent effect is not easily obtained. If the pigment volume concentration of the component (B) is too large, the paint film is easily cracked so that the waterproof performance and the antifouling performance of the film and other physical properties thereof may become insufficient. The pigment volume concentration of the component (B) in the invention is the percentage by volume of the component (B) contained in the dry paint film, and is a value obtained by calculation from the blended amounts of the binder and the component (B) which constitute the coating agent.

In the invention, a particulate matter other than the component (B), for example, an inorganic color pigment or an organic color pigment can be mixed with the above-mentioned components as long as the water repellent effect and the other effects based on the components are not damaged. The mixing of such a color pigment makes it possible to adjust the color tone of the coating agent to a desired tone, and make the water repellent performance and other performances of the formed paint film high. The average particle diameter of the color pigment is usually less than 0.5 μm, preferably 0.4 μm or less.

The pigment volume concentration of the whole of the coating agent of the invention is from 40 to 90%, preferably 45 to 80%. In the case of attaching importance, in particular, to an improvement in the water slipping-down property (contact angle), this pigment volume concentration is preferably 60% or more. In the case of attaching importance to an improvement in the sealability (water anti-permeability) or the antifouling performance, the pigment volume concentration is preferably less than 60% by volume. When the pigment volume concentration of the whole of the coating agent is set into such a range, the advantageous effects of the invention can stably be obtained. The pigment volume concentration of the whole of the coating agent is the percentage by volume of the whole of the particulate matter(s) contained in the dry paint film, and is a value obtained by calculation from the blended amounts of the binder and the particulate matter(s) that constitute the coating agent, which may be a paint.

Additionally, the coating agent of the invention may contain a component which can be used in an ordinary paint as long as the advantageous effects of the invention are not remarkably damaged. Examples of the component include a thickener, a film-forming auxiliary agent, a leveling agent, a wetting agent, a plasticizer, an antifreezing agent, a pH adjustor, a preservative, an antifungal agent, an anti-alga agent, an antibacterial agent, a dispersing agent, an antifoaming agent, an adsorbent, an aggregate, a fiber, a water repellent, a crosslinking agent, an ultraviolet absorber, an antioxidant, and a catalyst. The coating agent of the invention can be produced by mixing components as described above homogeneously in a usual way.

The coating agent of the invention can be used mainly for coating onto buildings or civil engineering structures. Examples of a substrate to which the agent can be applied include a plasterboard, a plywood, a concrete, a mortar, a porcelain tile, a fiber-blended cement board, a cement calcium silicate board, a slag cement perlite board, an ALC board, a siding board, an extruded board, a steel plate, and a plastic plate. The surface of these substrates may be subjected to a surface treatment (for example, a sealer, a surfacer, a filler or a pate). Such a substrate on which a paint film is already formed may be used.

When a primer such as a sealer or a surfacer is painted onto the surface of the substrate in the invention, the adhesiveness of the coating agent of the invention onto the substrate can be made high. Furthermore, it is possible to restrain water or the like from the outside certainly from invading the substrate. In the invention, the use of the primer makes it possible to exhibit the water repellent performance of the coating agent of the invention stably for a long term and give a stable effect for waterproof performance and so on.

A binder which can be used in the primer may be selected from various binders such as water-soluble resin, water-dispersible resin (resin emulsion), solvent-soluble resin, non-solvent resin, and water non-dispersible resin; binders each obtained by compounding two or more thereof; and others. In the invention, water-soluble resin and/or water dispersible resin is/are preferred. These may have crosslinking reactivity. The form of the binder is not particularly limited, and may be a one-liquid form or a two-liquid form. Examples of the kind of the resin that can be used include vinyl acetate resin, vinyl chloride resin, epoxy resin, silicone resin, acrylic resin, urethane resin, acrylic silicone resin, and fluorine-contained resin, and compounded resins each made of two or more thereof. In the invention, the above-mentioned component (A) and/or component (A-1) can be used as the binder in the primer.

It is desired to make the pigment volume concentration of the primer lower than that of the coating agent of the invention. Specifically, it is desired to set the pigment volume concentration of the primer usually to about 60% or less (preferably about 50% or less, more preferably about 40% or less). When the pigment volume concentration of the primer is in such a range, advantageous effects can be given for adhesiveness, waterproof performance and others.

The method for painting the primer may be a known method. The method is, for example, spray painting, roller painting, or brush painting. When the primer is a sealer, the painting amount thereof is usually from about 0.05 to 0.3 kg/m$^2$. When the agent is a surfacer, the painting amount thereof is usually from about 0.3 to 2 kg/m$^2$. About the primer, only one species thereof may be painted, or two or more species thereof may be painted into a multi-layered form.

According to the invention, the coating agent of the invention is painted onto a substrate as described above, whereby a paint film exhibiting excellent water repellent performance can be obtained. Specifically, a paint film can be formed which has a contact angle with water of 110° or more, preferably 120° or more, more preferably 130° or more, even more preferably 140° or more. The contact angle referred to herein is a value of the isostatic contact angle measured with a contact angle meter.

The method for painting the coating agent of the invention may be a known method. The method is, for example, spray painting, roller painting, or brush painting. When a dry building material is coated with the agent in an industry, the agent can be painted with a roll coater, a flow coater or the like. Since the coating agent of the invention is good in wettability to many substrates, repellence of the agent and other defects are not easily generated at the time of the painting.

The paint amount of the coating agent of the invention when the agent is painted is appropriately selected in accordance with the kind of the coating agent, which may be a paint, or the usage thereof, and is usually from about 0.05 to 0.5 kg/m$^2$. The coating agent of the invention may be repeatedly painted on a single site. When the coating agent or paint is painted, the viscosity thereof can be appropriately adjusted by diluting the agent or paint with water or the like. The dilution rate is selected to set the concentration of the coating agent usually into the range of about 0 to 20% by weight. After the coating agent of the invention is painted, the agent is dried ordinarily at room temperature. The agent may be heated and dried.

According to the painting of the coating agent of the invention, various unevenness patterns can be formed by selecting the kind of a tool for the painting or the using method thereof. The painting tool used in this case is, for example, a porous roller, or a design roller the surface of which has an unevenness form selected from various forms. An unevenness pattern may be formed by treating the paint surface with a design roller, a brush, a comb, a spatula or the like until the coating agent, which may be a paint or the like, is dried. Generally, when an unevenness pattern is given to a paint film, stains tend to remain in the concave portions of the paint film. However, in the paint film formed from the coating agent of the invention, such stains in its concave portions can easily be removed.

EXAMPLES

The invention will be made more evident by way of the following examples.

Production of Coating Agent (Paint):

Raw materials were mixed and stirred in a usual way in accordance with each formulation shown in Table 1. Thus, coating agents (paints) were produced. The used raw materials are as follows.

Resin 1: Multilayer-Structural Synthetic Resin Emulsion

Outer layer: an acrylic resin (Tg: 45° C.; constituents: t-butyl methacrylate, n-butyl methacrylate, n-butyl acrylate, 2-ethylhexyl acrylate and methacrylic acid; amount of carboxyl-group-containing monomers: 5% by weight), and a silicone resin (constituents: hexamethylcyclotrisiloxane, octamethylcyclotetrasiloxane, and decamethylcyclopentasiloxane); ratio by weight of the acrylic resin to the silicone resin in the outer layer: 80/20

Inner layer: an acrylic resin (Tg: −50° C., constituents: n-butyl methacrylate, n-butyl acrylate, and 2-ethylhexyl acrylate)

Ratio by weight of the outer layer to the inner layer: 45/55

Solid content: 50% by weight

Resin 2: Multilayer-Structural Synthetic Resin Emulsion

Outer layer: an acrylic resin (Tg: 45° C.; constituents: t-butyl methacrylate, n-butyl methacrylate, n-butyl acrylate, 2-ethylhexyl acrylate, and methacrylic acid; amount of carboxyl-group-containing monomers: 5% by weight), and a silicone resin (constituents: hexamethylcyclotrisiloxane, octamethylcyclotetrasiloxane, and decamethylcyclopentasiloxane); ratio by weight of the acrylic resin to the silicone resin in the outer layer: 80/20

Inner layer: an acrylic resin (Tg: −50° C., constituents: n-butyl methacrylate, n-butyl acrylate, and 2-ethylhexyl acrylate), and a silicone resin (constituents: hexamethylcyclotrisiloxane, octamethylcyclotetrasiloxane, and decamethylcyclopentasiloxane); ratio by weight of the acrylic resin to the silicone resin in the inner layer: 80/20

Ratio by weight of the outer layer to the inner layer: 45/55

Solid content: 50% by weight

Resin 3: Multilayer-Structural Synthetic Resin Emulsion

Outer layer: an acrylic resin (Tg: 45° C.; constituents: t-butyl methacrylate, n-butyl methacrylate, n-butyl acrylate, 2-ethylhexyl acrylate, and methacrylic acid; amount of carboxyl-group-containing monomers: 5% by weight), and a silicone resin (constituents: hexamethylcyclotrisiloxane, octamethylcyclotetrasiloxane, decamethylcyclopentasiloxane, and γ-methacryloyloxypropyltrimethoxysilane); ratio by weight of the acrylic resin to the silicone resin in the outer layer: 92/8

Inner layer: an acrylic resin (Tg: −50° C., constituents: n-butyl methacrylate, n-butyl acrylate, and 2-ethylhexyl acrylate), and a silicone resin (constituents: hexamethylcyclotrisiloxane, octamethylcyclotetrasiloxane, decamethylcyclopentasiloxane, and γ-methacryloyloxypropyltrimethoxysilane); ratio by weight of the acrylic resin to the silicone resin in the inner layer: 92/8

Ratio by weight of the outer layer to the inner layer: 45/55

Solid content: 50% by weight

Resin 4: Multilayer-Structural Synthetic Resin Emulsion

Outer layer: an acrylic resin (Tg: 45° C.; constituents: t-butyl methacrylate, n-butyl methacrylate, n-butyl acrylate, 2-ethylhexyl acrylate, and methacrylic acid; amount of carboxyl-group-containing monomers: 5% by weight), and a silicone resin (constituents: hexamethylcyclotrisiloxane, octamethylcyclotetrasiloxane, and decamethylcyclopentasiloxane); ratio by weight of the acrylic resin to the silicone resin in the outer layer: 55/45

Inner layer: an acrylic resin (Tg: −50° C., constituents: n-butyl methacrylate, n-butyl acrylate, and 2-ethylhexyl acrylate), and a silicone resin (constituents: hexamethylcyclotrisiloxane, octamethylcyclotetrasiloxane, and decamethylcyclopentasiloxane); ratio by weight of the acrylic resin to the silicone resin in the inner layer: 55/45

Ratio by weight of the outer layer to the inner layer: 45/55

Solid content: 50% by weight

Resin 5: Multilayer-Structural Synthetic Resin Emulsion

Outer layer: an acrylic resin (Tg: 45° C.; constituents: t-butyl methacrylate, n-butyl methacrylate, n-butyl acrylate, 2-ethylhexyl acrylate, and methacrylic acid; amount of carboxyl-group-containing monomers: 5% by weight)

Inner layer: a silicone resin (constituents: hexamethylcyclotrisiloxane, octamethylcyclotetrasiloxane, and decamethylcyclopentasiloxane)
    Ratio by weight of the outer layer to the inner layer: 70/30
    Solid content: 50% by weight
Resin 6: Multilayer-Structural Synthetic Resin Emulsion
    Outer layer: an acrylic resin (Tg: 45° C.; constituents: t-butyl methacrylate, n-butyl methacrylate, n-butyl acrylate, 2-ethylhexyl acrylate, and methacrylic acid; amount of carboxyl-group-containing monomers: 5% by weight)
    Inner layer: an acrylic resin (Tg: −50° C., constituents: n-butyl methacrylate, n-butyl acrylate, and 2-ethylhexyl acrylate)
    Ratio by weight of the outer layer to the inner layer: 50/50
    Solid content: 50% by weight
Resin 7: acrylic resin emulsion (Tg: 12° C.; constituents: t-butyl methacrylate, n-butyl methacrylate, n-butyl acrylate, 2-ethylhexyl acrylate, and methacrylic acid; solid content: 50% by weight
Resin 8: crosslinking-reactive acrylic resin emulsion (Tg: 20° C., constituents: methyl methacrylate, styrene, 2-ethylhexyl acrylate, diacetone acrylamide, and acrylic acid; crosslinking agent: dihydrazide adipate; solid content: 50% by weight)
Crosslinking agent: epoxy-group-containing compound (polyhydroxyalkane polyglycidyl ether)
Particulate matter 1: silica powder (average particle diameter: 18 μm, oil absorption: 10 mL/100 g, specific gravity: 2.7)
Particulate matter 2: silica powder (average particle diameter: 4 μm, oil absorption: 10 mL/100 g, specific gravity: 2.7)
Particulate matter 3: silica powder (average particle diameter: 72 μm, oil absorption: 10 mL/100 g, specific gravity: 2.7)
Particulate matter 4: talc (average particle diameter: 12 μm, oil absorption: 35 mL/100 g, specific gravity: 2.7)
Particulate matter 5: diatomaceous earth (average particle diameter: 9 μm, oil absorption: 170 mL/100 g, specific gravity: 2.3)
Color pigment 1: titanium oxide (average particle diameter: 0.2 μm, oil absorption: 13 mL/100 g, specific gravity: 4.2)
Color pigment 2: Fast Yellow 10G (average particle diameter: 0.2 μm, oil absorption: 40 mL/100 g, specific gravity: 1.6)
Water repellent: dimethylsiloxane compound dispersion (solid content: 50% by weight)
Film-forming auxiliary agent: 2,2,4-trimethyl-1,3-pentanediol monoisobutyrate
Dispersing agent: polycarboxylic acid based dispersing agent (solid content: 30% by weight)
Thickener: polyurethane based thickener (solid content: 30% by weight) Antifoaming agent: silicone based antifoaming agent (solid content: 50% by weight)

Test Examples 1 to 18

About Test Examples 1 to 18, tests were made by the following methods:
(1) Contact Angle Measurement
An epoxy resin based primer (pigment volume concentration: 0%, the same matter being applied correspondingly to the following description) was sprayed onto an aluminum plate, 150×70×0.8 mm, to give a paint amount of 0.1 kg/m², and then the resultant was dried at a temperature of 23° C. and a relative humidity of 50% (the condition being referred to as a standard condition hereinafter) for 8 hours. Thereafter, each of the water-based paints obtained by the above-mentioned method was diluted with water (on the day following the production thereof, so as to give a paint concentration of 10%. The diluted paint was sprayed onto the primer layer to give a paint amount of 0.2 kg/m². The resultant was dried under a standard condition for 14 days to prepare a test piece. Onto the paint film surface of this test piece was dropped 0.2 cc of deionized water. Immediately after the dropping, the contact angle was measured with a CA-A type contact angle meter manufactured by Kyowa Interface Science Co., Ltd.

Each of the water-based paints obtained by the above-mentioned method was air-tightly put into a container, and then the container was stored in a 50° C. thermostat for 7 days. Thereafter, a test piece was formed in the same way, and then the contact angle thereof was measured.
(2) Water Slipping-Down Property
An epoxy resin based primer was sprayed onto an aluminum plate, 150×70×0.8 mm, to give a paint amount of 0.1 kg/m², and then the resultant was dried under a standard condition for 8 hours. Thereafter, each of the water-based paints obtained by the above-mentioned method was diluted with water (on the day following the production thereof, so as to give a paint concentration of 10%. The diluted paint was sprayed onto the primer layer to give a paint amount of 0.2 kg/m². The resultant was dried under a standard condition for 14 days to prepare a test piece. This test piece was inclined at an angle of 15 degrees from a horizontal plane, and deionized water was continuously dropped onto the paint film surface of the test piece. At this time, the following were observed with the naked eye to evaluate the test piece: the slipping-down state of the water droplets; and whether or not remaining traces of the water droplets were present after the dropping. About a criterion for the evaluation, a case where the droplets slipped down into a spherical form and no traces of the water droplets remained is represented by "⊚", a case where the droplets slipped down into a spherical form and traces of the water droplets hardly remained is represented by "○", a case where the droplets slipped down into a spherical form but traces of the water droplets remained is represented by Δ, and a case where the droplets did not slip down into a spherical form and traces of the water droplets remained is represented by x.

Each of the water-based paints obtained by the above-mentioned method was air-tightly put into a container, and then the container was stored in a 50° C. thermostat for 7 days. Thereafter, a test was made in the same way.
(3) Paintability Test
An epoxy resin based primer was sprayed onto a slate plate, 900×900×3 mm, to give a paint amount of 0.1 kg/m², and then the resultant was dried under a standard condition for 8 hours. Thereafter, each of the water-based paints was diluted with water (on the day following the production thereof), so as to give a paint concentration of 10%. The diluted paint was sprayed onto the primer to give a paint amount of 0.2 kg/m², and then the surface state was observed. About a criterion for the evaluation, a case where the cissing of paint was not seen is represented by "○", a case where the cissing of paint was slightly seen is represented by "Δ", and a case where the cissing of paint was clearly seen is represented by "x".
(4) Water Resistance Test
An epoxy resin based primer was sprayed onto a slate plate, 150×70×3 mm, to give a paint amount of 0.1 kg/m², and then the resultant was dried under a standard condition for 8 hours. Thereafter, each of the water-based paints was diluted with water (on the day following the production thereof), so as to give a paint concentration of 10%. The diluted paint was sprayed onto the primer to give a paint amount of 0.2 kg/m², and then the resultant was cured for 14 days to prepare a test piece. This test piece was immersed in 50° C. hot water for 24 hours, and then the adhesiveness of the paint was evaluated by a lattice pattern cutting test according to JIS K 5600-5-6. About a criterion for the evaluation, a case where the area of lost portions was less than 5% is represented by "◯◯", a case where the area of lost portions was 5% or more and less than 15% is represented by "◯", a case where the area of lost portions was 15% or more and less than 35% is represented by "Δ", and a case where the area of lost portions was 35% or more is represented by "x".

(5) Heat and Cold Repeating Moisture Resistance Test

An epoxy resin based primer was sprayed onto a slate plate, 150×70×3 mm, to give a paint amount of 0.1 kg/m², and then the resultant was dried under a standard condition for 8 hours. Thereafter, each of the water-based paints was diluted with water (on the day following the production thereof), so as to give a paint concentration of 10%. The diluted paint was sprayed onto the primer to give a paint amount of 0.2 kg/m², and then the resultant was cured for 14 days to prepare a test piece. This test piece was immersed in 23° C. water for 18 hours. Immediately after the immersion, the test piece was cooled in a thermostat, the temperature of which was kept at −20° C., for 3 hours, and then heated in another thermostat, the temperature of which was kept at 50° C., for 3 hours. This operation was repeated 10 times, and then left as it was under a standard condition for about 1 hour. The state of the paint film surface was observed with the naked eye by checking the degree of generated abnormalities (cracking, blistering and peeling). About a criterion for the evaluation, a case where abnormalities were not generated at all is represented by "◯◯", a case where abnormalities were hardly generated is represented by "◯", a case where abnormalities were partially generated is represented by "Δ", and a case where abnormalities were remarkably generated is represented by "x".

(6) Water Repellency Retaining Test

An epoxy resin based primer was sprayed onto an aluminum plate, 150×70×0.8 mm, to give a paint amount of 0.1 kg/m², and then the resultant was dried under a standard condition for 8 hours. Thereafter, each of the water-based paints was diluted with water (on the day following the production thereof), so as to give a paint concentration of 10%. The diluted paint was sprayed onto the primer layer to give a paint amount of 0.2 kg/m². The resultant was dried under a standard condition for 14 days to prepare a test piece. Onto the paint film surface of this test piece was dropped 0.2 cc of deionized water. Immediately after the dropping, the contact angle was measured with a CA-A type contact angle meter manufactured by Kyowa Interface Science Co., Ltd.

Next, this test piece was immersed in 23° C. water for 3 hours, and then dried under a standard condition for 1 hour. Thereafter, the contact angle was measured in the same way. In this test, the test piece was evaluated by checking the degree of a fall from the initial contact angle to the contact angle after the immersion in water. About a criterion for the evaluation, a case where the fall was less than 5 degrees is represented by "◯", and a case where the fall was 5 degrees or more and less than 10 degrees is represented by "Δ", and a case where the fall was 10 degrees or more is represented by "x".

(7) Antifouling Performance Test
(7-1) Antifouling Performance Test 1

An epoxy resin based primer was sprayed onto a slate plate, 150×70×3 mm, to give a paint amount of 0.1 kg/m², and then the resultant was dried under a standard condition for 8 hours. Thereafter, each of the water-based paints was diluted with water (on the day following the production thereof, so as to give a paint concentration of 10%. The diluted paint was sprayed onto the primer to give a paint amount of 0.2 kg/m², and then the resultant was cured for 14 days to prepare a test piece. This test piece was inclined at an angle of 15 degrees from a horizontal plane, and then a dropping pipette was used to drop 2 cc of a commercially available soy sauce onto the paint film surface of the test piece. The test piece was left as it was for 15 minutes, and then water was caused to flow onto the paint film surface. The state of the paint film surface at this time was observed with the naked eye. About a criterion for the evaluation, a case where no spot was observed is represented by "◯◯", and a case where spots were remarkably observed is represented by "x". The evaluation was made at 4 ranks from "◯◯" to "x" (i.e., ◯◯>◯>Δ>x).

(7-2) Antifouling Performance Test 2

A test piece was prepared in the same way as in the above-mentioned antifouling performance test 1, and this test piece was inclined at an angle of 15 degrees from a horizontal plane, and then a dropping pipette was used to drop 2 cc of a 0.01% solution of a food color (Red 102) in water onto the paint film surface of the test piece. The test piece was left as it was for 15 minutes, and then water was caused to flow onto the paint film surface. The state of the paint film surface at this time was evaluated in accordance with the same criterion as in the above-mentioned antifouling performance test 1.

(7-3) Antifouling Performance Test 3

A test piece was prepared in the same way as in the above-mentioned antifouling performance test 1, and this test piece was inclined at an angle of 15 degrees from a horizontal plane, and then a dropping pipette was used to drop 2 cc of a commercially available plant oil onto the paint film surface of the test piece. The test piece was left as it was for 15 minutes, and then the remaining plant oil was removed with a piece of dry gauze. Next, the paint film surface was wiped with a piece of gauze into which a neutral detergent was infiltrated. The state of the paint film surface at this time was evaluated in accordance with the same criterion as in the above-mentioned antifouling performance test 1.

(7-4) Antifouling Performance Test 4

A test piece was prepared in the same way as in the above-mentioned antifouling performance test 1, and a black rubber was rubbed onto the paint film surface of the test piece. Thereafter, the surface was wiped with water. The state of the paint film surface at this time was evaluated in accordance with the same criterion as in the above-mentioned antifouling performance test 1.

(8) Water Permeation Test

An epoxy resin based primer was sprayed onto a slate plate, 400×200×6 mm, to give a paint amount of 0.1 kg/m², and then the resultant was dried under a standard condition for 8 hours. Thereafter, each of the water-based paints was diluted with water (on the day following the production thereof), so as to give a paint concentration of 10%. The diluted paint was sprayed onto the primer to give a paint amount of 0.2 kg/m², and then the resultant was cured for 14 days to prepare a test piece. The permeated water volume of the resultant test piece was measured in accordance with the process described in JIS A 6909 7.13 "Water Permeation Test B method". About a criterion for the evaluation, a case where the permeated water volume was less than 0.2 mL is represented by "◯◯", a case where the volume was 0.2 mL or more and less than 0.5 mL is represented by "◯", a case where the volume was 0.5 mL or more and less than 1 mL is represented by "Δ", and a case where the volume was 1 mL or more is represented by "x".

(9) Acceleration Weatherability Method

An epoxy resin based primer was sprayed onto an aluminum plate, 150×70×0.8 mm, to give a paint amount of 0.1 kg/m², and then the resultant was dried under a standard condition for 8 hours. Thereafter, each of the water-based paints was diluted with water (on the day following the production thereof), so as to give a paint concentration of 10%.

The diluted paint was sprayed onto the primer to give a paint amount of 0.2 kg/m². The resultant was dried under a standard condition for 14 days to prepare a test piece.

This test piece was exposed to an environment inside an acceleration weatherability test machine ("Metal Weather Meter [transliteration]", manufactured by Daipla Wintes Co., Ltd.) for 320 hours. After the exposure, the external appearance of the paint film was observed with the naked eye. About a criterion for the evaluation, a case where no abnormalities (such as cracking, peeling and blistering) were not observed is represented by "○", and a case where one or more out of the abnormalities were observed is represented by "X". After the exposure, 0.2 cc of deionized water was dropped onto the paint film surface. Immediately after the dropping, the contact angle was measured with a CA-A type contact angle meter manufactured by Kyowa Interface Science Co., Ltd.

Test Example 19

The same tests (1) to (8) as described above were made, using the paint of Test Example 4 instead of the epoxy resin based primer and using the paint of Test Example 2 as a water-based paint.

Test Example 20

An epoxy resin based primer was sprayed onto a slate plate, 150×70×3 mm, to give a paint amount of 0.1 kg/m², and the resultant was dried under a standard condition for 8 hours. Thereafter, the water-based paint of Test Example 6 was diluted with water (on the day following the production thereof, so as to give a paint concentration of 10%. The diluted paint was painted onto the primer with a short-bristle roller to give a paint amount of 0.1 kg/m². The resultant was dried for 2 hours, and then the water-based paint of Test Example 6, which was not diluted, was painted onto the dried paint with a porous roller (on the day following the production of the paint of Test Example 6), so as to give a paint amount of 0.35 kg/m². Immediately, a design roller, the surface of which had unevenness in a lattice form, was used to form unevenness in the paint surface. Thereafter, the resultant was cured for 14 days to prepare a test piece. About this test piece, antifouling performance tests were made in the same manners as in the above-mentioned antifouling performance tests 1 to 4.

Test Example 21

An epoxy resin based primer was sprayed onto a slate plate, 150×70×3 mm, to give a paint amount of 0.1 kg/m², and the resultant was dried under a standard condition for 8 hours. Thereafter, the water-based paint of Test Example 17 was diluted with water (on the day following the production thereof, so as to give a paint concentration of 10%. The diluted paint was painted onto the primer with a short-bristle roller to give a paint amount of 0.1 kg/m². The resultant was dried for 2 hours, and then the water-based paint of Test Example 17, which was not diluted, was painted onto the dried paint with a porous roller (on the day following the production of the paint of Test Example 17), so as to give a paint amount of 0.35 kg/m². Immediately, a design roller, the surface of which had unevenness in a lattice form, was used to form unevenness in the paint surface. Thereafter, the resultant was cured for 14 days to prepare a test piece. About this test piece, antifouling performance tests were made in the same manners as in the above-mentioned antifouling performance tests 1 to 4.

Test Results

The test results are shown in Tables 3 and 4. About Test Examples 1 to 13 and Test Examples 19 and 20, very good results were obtained in all of the tests.

TABLE 1

| | | Test Example 1 | Test Example 2 | Test Example 3 | Test Example 4 | Test Example 5 | Test Example 6 | Test Example 7 | Test Example 8 | Test Example 9 | Test Example 10 |
|---|---|---|---|---|---|---|---|---|---|---|---|
| Components (parts by weight) | Resin 1 | 200 | — | — | — | — | — | — | — | — | — |
| | Resin 2 | — | 200 | — | 200 | 200 | 200 | — | — | 200 | 200 |
| | Resin 3 | — | — | — | — | — | — | 200 | — | — | — |
| | Resin 4 | — | — | — | — | — | — | — | 200 | — | — |
| | Resin 5 | — | — | 200 | — | — | — | — | — | — | — |
| | Resin 6 | — | — | — | — | — | — | — | — | — | — |
| | Resin 7 | — | — | — | — | — | — | — | — | — | — |
| | Resin 8 | — | — | — | — | — | — | — | — | — | — |
| | Crosslinking agent | — | — | — | — | 2 | — | — | — | — | — |
| | Particulate matter 1 | 670 (62%) | 670 (62%) | 670 (62%) | 210 (38%) | 670 (62%) | 120 (22%) | 120 (22%) | 120 (22%) | — | — |
| | Particulate matter 2 | — | — | — | — | — | — | — | — | 120 (22%) | — |
| | Particulate matter 3 | — | — | — | — | — | — | — | — | — | 120 (22%) |
| | Particulate matter 4 | — | — | — | — | — | 65 (12%) | 65 (12%) | 65 (12%) | 65 (12%) | 65 (12%) |
| | Particulate matter 5 | — | — | — | — | — | — | — | — | — | — |
| | Color pigment 1 | 218 (13%) | 218 (13%) | 218 (13%) | 110 (13%) | 218 (13%) | 150 (17%) | 150 (17%) | 150 (17%) | 150 (17%) | 150 (17%) |
| | Color pigment 2 | — | — | — | — | — | — | — | — | — | — |
| | Water repellent | — | — | — | — | — | — | — | — | — | — |
| | Film-forming auxiliary agent | 25 | 25 | 25 | 25 | 25 | 25 | 25 | 25 | 25 | 25 |
| | Dispersing agent | 15 | 15 | 15 | 15 | 15 | 15 | 15 | 15 | 15 | 15 |

TABLE 1-continued

|  |  | Test Example 1 | Test Example 2 | Test Example 3 | Test Example 4 | Test Example 5 | Test Example 6 | Test Example 7 | Test Example 8 | Test Example 9 | Test Example 10 |
|---|---|---|---|---|---|---|---|---|---|---|---|
|  | Thickener | 10 | 10 | 10 | 8 | 10 | 10 | 10 | 10 | 10 | 10 |
|  | Antifoaming agent | 3 | 3 | 3 | 3 | 3 | 3 | 3 | 3 | 3 | 3 |
| Pigment volume concentration of the whole of the paint |  | 75% | 75% | 75% | 51% | 75% | 51% | 51% | 51% | 51% | 51% |

The numbers in parentheses are each the pigment volume concentration (%) of each particulate matter.

TABLE 2

|  |  | Test Example 11 | Test Example 12 | Test Example 13 | Test Example 14 | Test Example 15 | Test Example 16 | Test Example 17 | Test Example 18 |
|---|---|---|---|---|---|---|---|---|---|
| Components (parts by weight) | Resin 1 | — | — | — | — | — | — | — | — |
|  | Resin 2 | 200 | 200 | 160 | — | — | — | — | — |
|  | Resin 3 | — | — | — |  |  |  |  |  |
|  | Resin 4 | — | — |  |  |  |  |  |  |
|  | Resin 5 | — | — | — | 200 | 200 | — | — | — |
|  | Resin 6 | — | — | — | — | — | 200 | — | — |
|  | Resin 7 | — | — | — | — | — | — | 200 | 200 |
|  | Resin 8 | — | — | 40 | — | — | — | — | — |
|  | Crosslinking agent | — | — | — | — | — | — | — | — |
|  | Particulate matter 1 | 95 (18%) | 120 (25%) | 120 (22%) | 110 (25%) | — | 210 (38%) | 210 (38%) | 210 (38%) |
|  | Particulate matter 2 | — | — | — | — | — | — | — | — |
|  | Particulate matter 3 | — | — | — | — | — | — | — | — |
|  | Particulate matter 4 | 47 (9%) | 65 (14%) | 65 (12%) | — | — | — | — | — |
|  | Particulate matter 5 | — | — | — | — | 178 (38%) | — | — | — |
|  | Color pigment 1 | 170 (21%) | — | 150 (17%) | 88 (13%) | 110 (13%) | 110 (13%) | 110 (13%) | 110 (13%) |
|  | Color pigment 2 | — | 15 (5%) | — | — | — | — | — | — |
|  | Water repellent | — | — | — | — | — | — | — | 50 |
|  | Film-forming auxiliary agent | 25 | 25 | 25 | 25 | 25 | 25 | 25 | 25 |
|  | Dispersing agent | 15 | 15 | 15 | 15 | 30 | 15 | 15 | 15 |
|  | Thickener | 10 | 10 | 10 | 8 | 8 | 8 | 8 | 8 |
|  | Antifoaming agent | 3 | 3 | 3 | 3 | 3 | 3 | 3 | 3 |
| Pigment volume concentration of the whole of the paint |  | 48% | 44% | 51% | 38% | 51% | 51% | 51% | 51% |

The numbers in parentheses are each the pigment volume concentration (%) of each particulate matter.

TABLE 3

|  | Test Example 1 | Test Example 2 | Test Example 3 | Test Example 4 | Test Example 5 | Test Example 6 | Test Example 7 | Test Example 8 | Test Example 9 | Test Example 10 |
|---|---|---|---|---|---|---|---|---|---|---|
| Contact angle (at an initial stage) | 147 | 148 | 145 | 128 | 146 | 132 | 131 | 135 | 134 | 130 |
| Contact angle (after the storage) | 148 | 151 | 142 | 132 | 147 | 133 | 131 | 137 | 135 | 132 |
| Water slipping-down property (at an initial stage) | ⊚ | ⊚ | ⊚ | ○ | ⊚ | ○ | ○ | ○ | ○ | ○ |
| Water slipping-down property (after the storage) | ⊚ | ⊚ | ○ | ○ | ⊚ | ○ | ○ | ○ | ○ | ○ |

TABLE 3-continued

|  | Test Example 1 | Test Example 2 | Test Example 3 | Test Example 4 | Test Example 5 | Test Example 6 | Test Example 7 | Test Example 8 | Test Example 9 | Test Example 10 |
| --- | --- | --- | --- | --- | --- | --- | --- | --- | --- | --- |
| Paintability | ○ | ○ | ○ | ○ | ○ | ○ | ○ | ○ | ○ | ○ |
| Water resistance | ○ | ○ | ○ | ○ | ○○ | ○ | ○ | ○ | ○ | ○ |
| Heat and cold repeating moisture resistance | ○ | ○○ | ○ | ○○ | ○○ | ○○ | ○○ | ○○ | ○○ | ○○ |
| Water repellency retaining property | ○ | ○ | ○ | ○ | ○ | ○ | ○ | ○ | ○ | ○ |
| Antifouling performance 1 | ○○ | ○○ | ○ | ○ | ○○ | ○○ | ○○ | ○○ | ○○ | ○○ |
| Antifouling performance 2 | ○○ | ○○ | ○ | ○ | ○○ | ○○ | ○○ | ○○ | ○○ | ○○ |
| Antifouling performance 3 | ○ | ○ | ○ | ○ | ○ | ○○ | ○○ | ○○ | ○○ | ○○ |
| Antifouling performance 4 | ○ | ○ | ○ | ○ | ○ | ○○ | ○○ | ○○ | ○○ | ○○ |
| Permeated water volume | ○ | ○ | ○ | ○○ | ○ | ○○ | ○○ | ○○ | ○○ | ○○ |
| Acceleration weatherability (external appearance) | ○ | ○ | ○ | ○ | ○ | ○ | ○ | ○ | ○ | ○ |
| Acceleration weatherability (contact angle) | 151 | 153 | 147 | 135 | 152 | 138 | 136 | 140 | 138 | 135 |

TABLE 4

|  | Test Example 11 | Test Example 12 | Test Example 13 | Test Example 14 | Test Example 15 | Test Example 16 | Test Example 17 | Test Example 18 | Test Example 19 | Test Example 20 | Test Example 21 |
| --- | --- | --- | --- | --- | --- | --- | --- | --- | --- | --- | --- |
| Contact angle (at an initial stage) | 130 | 132 | 130 | 100 | 95 | 90 | 92 | 107 | 148 | — | — |
| Contact angle (after the storage) | 132 | 133 | 130 | 100 | 98 | 91 | 90 | 92 | 150 | — | — |
| Water slipping-down property (at an initial stage) | ○ | ○ | ○ | Δ | X | X | X | Δ | ○○ | — | — |
| Water slipping-down property (after the storage) | ○ | ○ | ○ | Δ | X | X | X | X | ○○ | — | — |
| Paintability | ○ | ○ | ○ | ○ | ○ | ○ | ○ | X | ○ | — | — |
| Water resistance | ○ | ○ | ○○ | ○ | Δ | ○ | ○ | ○ | ○ | — | — |
| Heat and cold repeating moisture resistance | ○○ | ○○ | ○○ | ○○ | X | Δ | X | X | ○○ | — | — |
| Water repellency retaining property | ○ | ○ | ○ | ○ | ○ | ○ | ○ | X | ○ | — | — |
| Antifouling performance 1 | ○○ | ○○ | ○○ | ○ | X | Δ | X | Δ | ○○ | ○○ | X |
| Antifouling performance 2 | ○○ | ○○ | ○○ | Δ | X | X | X | Δ | ○○ | ○○ | X |
| Antifouling performance 3 | ○○ | ○○ | ○○ | Δ | X | Δ | X | X | ○ | ○○ | X |
| Antifouling performance 4 | ○○ | ○○ | ○○ | Δ | X | X | X | X | ○ | ○○ | X |
| Permeated water volume | ○○ | ○○ | ○○ | ○○ | ○ | ○○ | ○○ | ○ | ○○ | — | — |
| Acceleration weatherability (external appearance) | ○ | ○ | ○ | ○ | ○ | ○ | ○ | ○ | ○ | — | — |
| Acceleration weatherability (contact angle) | 136 | 137 | 151 | 105 | 90 | 88 | 85 | 101 | 152 | — | — |

What is claimed is:

1. A coating agent, comprising a synthetic resin emulsion (A) which comprises an acrylic resin obtained by polymerizing at least one monomer component, which comprises an alkyl ester of (meth)acrylic acid, and a silicone resin obtained by polymerizing at least one monomer component, which comprises a cyclic siloxane compound, wherein the acrylic resin and the silicone resin are mixed in emulsion particles at a ratio by weight of the acrylic resin to the silicone resin into the range of 99/1 to 30/70, and a particulate matter (B) comprising particles having an average particle diameter of 2 to 100 μm and an oil absorption of 60 mL/100 g or less, wherein the particulate matter (B) has a pigment volume concentration of 10 to 90%, and wherein the resin emulsion (A), which is used as a binder, comprises an outer layer of the emulsion particles of (A), which comprises the acrylic resin and the silicone resin mixed with each other, and an inner layer of the emulsion particles of (A), which comprises the acrylic resin.

2. The coating agent according to claim 1, wherein the silicone resin is present at least in a surface layer of the emulsion particles.

3. The coating agent according to claim 1, wherein the synthetic resin emulsion is a multilayer-structural synthetic resin emulsion (A-1) wherein the glass transition temperature of the acrylic resin in the inner layer is made lower than that of the acrylic resin in the outer layer.

4. The coating agent according to claim 1, wherein the particulate matter (B) comprises flake particles.

5. The coating agent according to claim 1, the whole of which has a pigment volume concentration of 40 to 90%.

6. The coating agent according to claim 1, wherein a carboxyl-group-containing monomer is copolymerized with the alkyl ester.

7. The coating agent according to claim 1, wherein a ratio by weight of the outer layer to the inner layer is from 80/20 to 20/80.

8. The coating agent according to claim 1, wherein Tg of the acrylic resin constituting the inner layer is set into the range of −60 to 20° C. and Tg of the outer layer is set into the range of 20 to 100° C.

9. The coating agent according to claim 1, wherein a particulate matter (B) comprising particles having an average particle diameter of 2 to 18 μm.

10. The coating agent according to claim 1, wherein a particulate matter (B) comprising particles having an average particle diameter of 2 to 4 μm.

11. The coating agent according to claim 1, wherein a particulate matter (B) comprising particles having an average particle diameter of 2 to 72 μm.

12. The coating agent according to claim 1, wherein a particulate matter (B) comprising particles having an average particle diameter of 2 to 12 μm.

13. The coating agent according to claim 1, wherein a particulate matter (B) comprising particles having an average particle diameter of 2 to 9 μm.

* * * * *